Sept. 25, 1923.

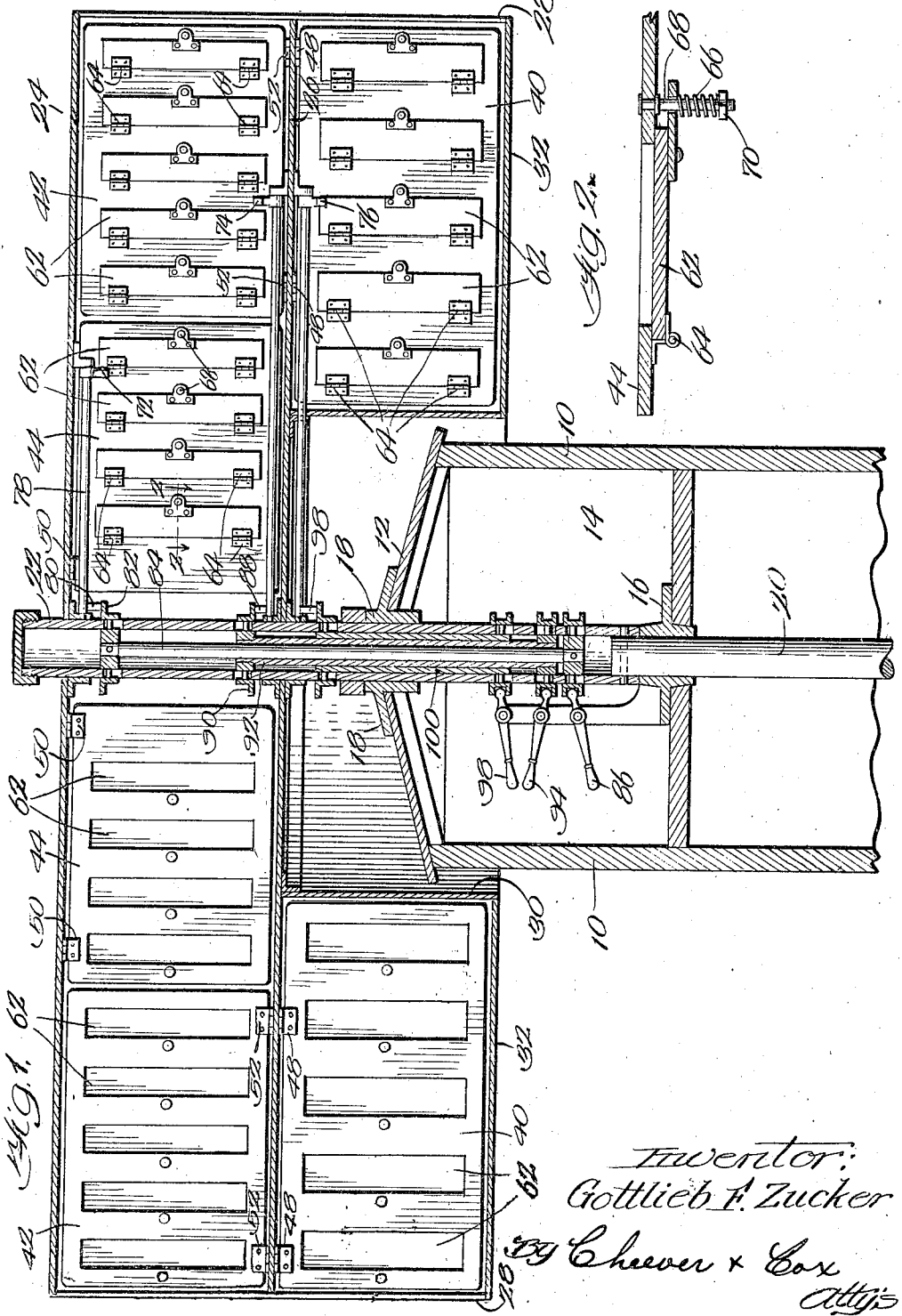

G. F. ZUCKER

WINDMILL

Filed March 22, 1922    4 Sheets-Sheet 2

1,469,064

Inventor:
Gottlieb F. Zucker
By Cheever & Cox
Attys

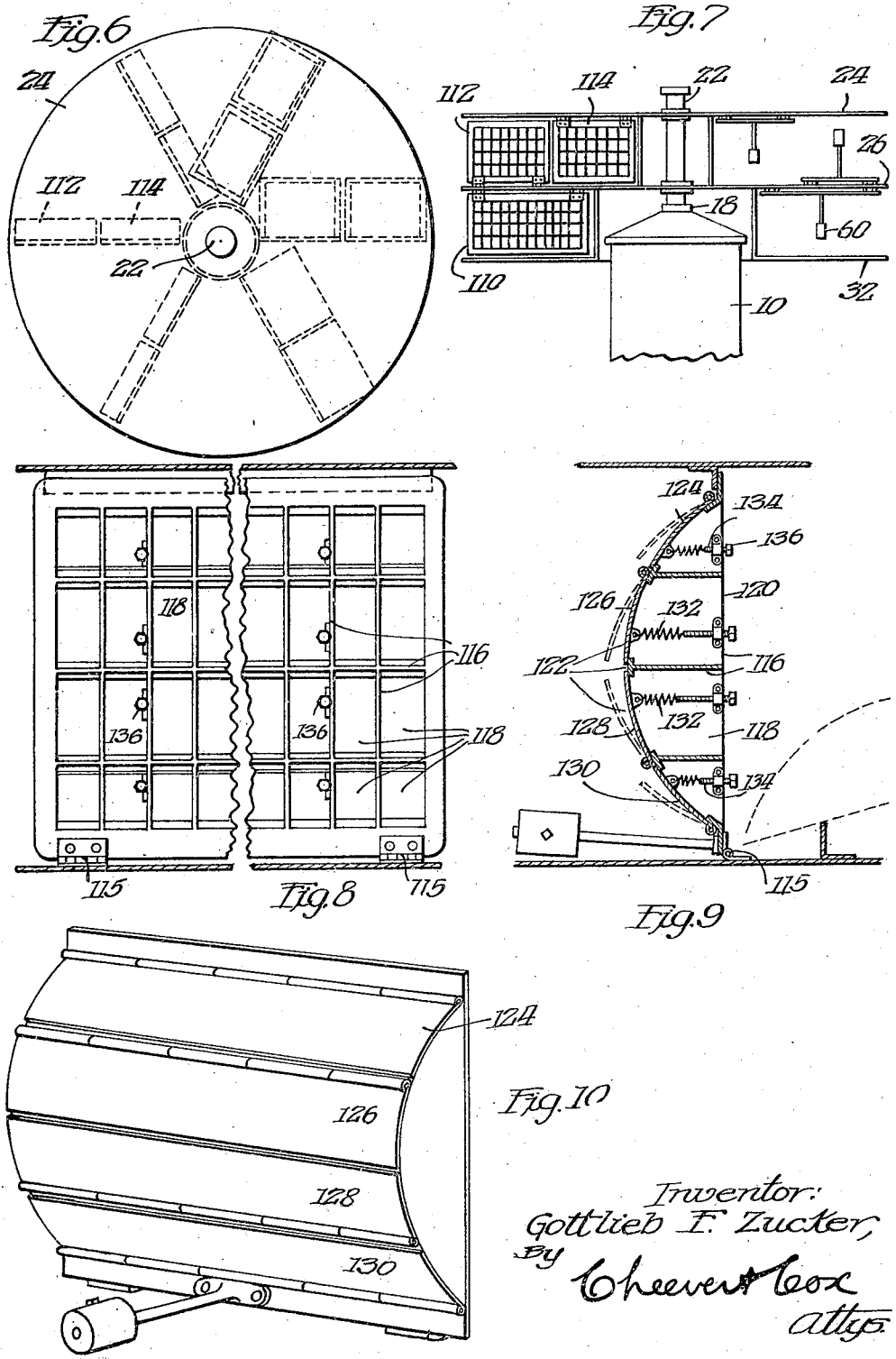

Sept. 25, 1923.  G. F. ZUCKER  1,469,064
WINDMILL
Filed March 22, 1922    4 Sheets-Sheet 4
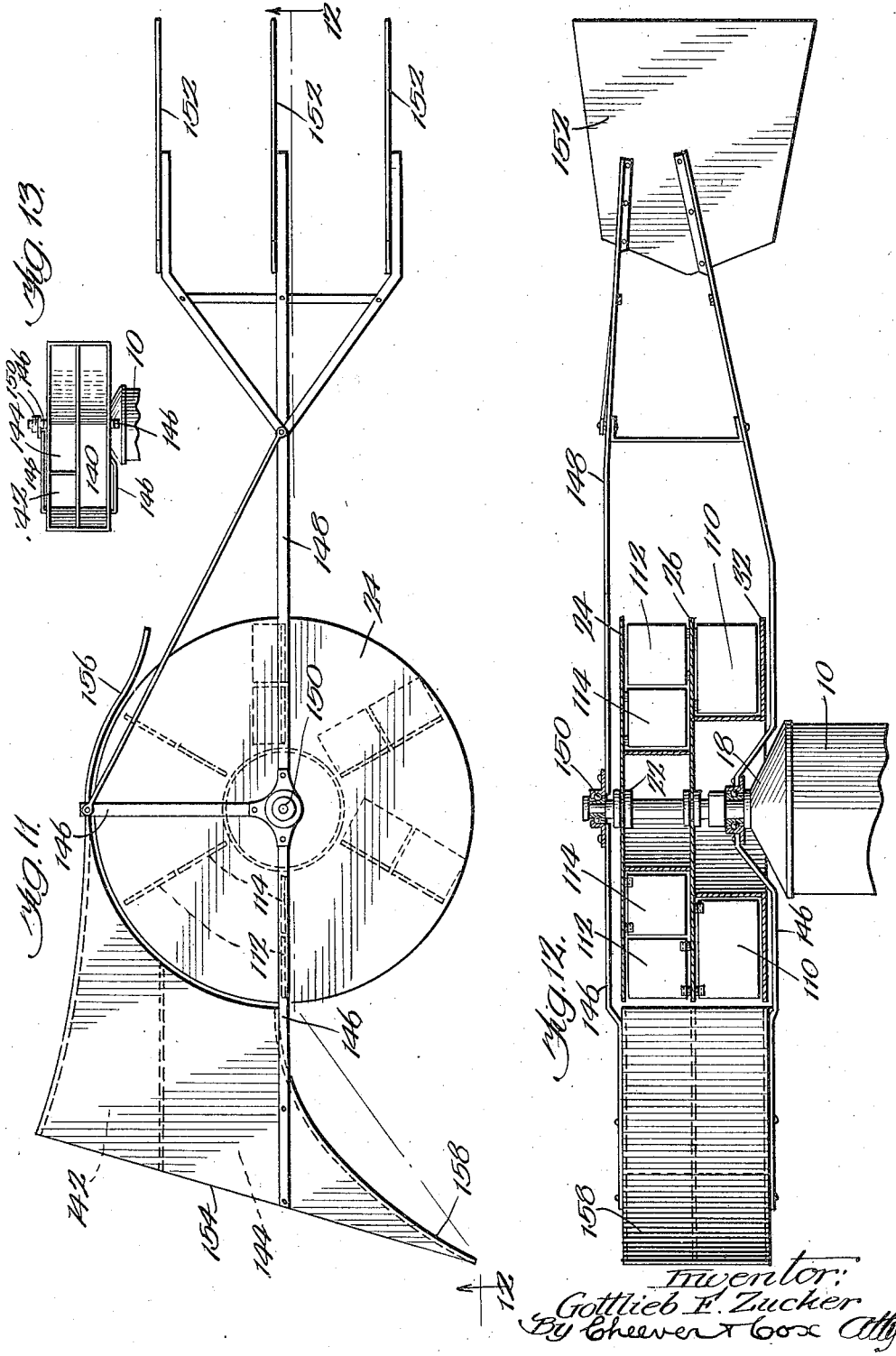

Patented Sept. 25, 1923.

1,469,064

UNITED STATES PATENT OFFICE.

GOTTLIEB F. ZUCKER, OF CHICAGO, ILLINOIS.

WINDMILL.

Application filed March 22, 1922. Serial No. 545,918.

*To all whom it may concern:*

Be it known that I, GOTTLIEB F. ZUCKER, a citizen of the United States, residing at Chicago, in the county of Cook and State of Illinois, have invented a certain new and useful Improvement in Windmills, of which the following is a specification.

This invention relates to air motor power. The object of the invention is to provide a mechanism of this class which is always ready to operate regardless of the direction of the wind and which can be adjusted to any wind velocity, the same being equipped with safety devices which prevent misoperation of or injury to the device in case of an unexpected change in the velocity of the wind.

The invention consists in mechanism for accomplishing the foregoing and other objects which can be easily and cheaply made, which is satisfactory in use and is not readily liable to get out of order. More particularly, the invention consists in the features and deails of construction hereafter more fully set forth in the specification and claims.

Referring to the drawings in which like numerals denote the same parts throughout the several views—

Figure 1 is a central vertical view partially in section, of the complete windmill mechanism illustrating this invention in its preferred form:

Figure 2 is a sectional plan view on the line 2—2 of Figure 1.

Figure 6 is a plan view corresponding to Figure 4, showing the mechanism of that figure equipped with a new form of wind blade;

Figure 7 is a similar view of the mechanism just referred to, corresponding to original Figure 5;

Figure 8 is a face view;

Figure 9 is a sectional side view;

Figure 10 is a perspective view of a new form of wind engagable door, taking the place of door 40—42—44 of the original application.

Figure 3:
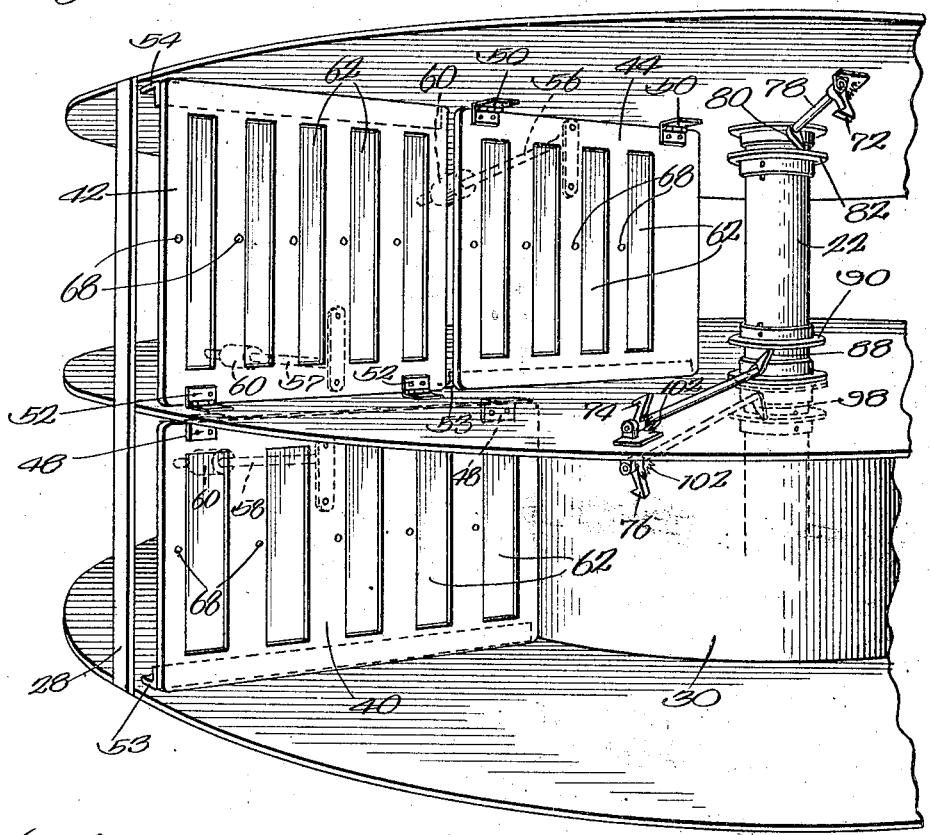
Figure 3 is a perspective view of the left hand half of the mechanism appearing in Figure 1.

The subject matter of the foregoing figures is all shown, described and claimed in my application No. 465,492, abandoned contemporaneously with the filing of this application and the subject matter of the first five figures was also disclosed in a still earlier application No. 360,933, which was abandoned on the filing of said application No. 465,492.

Figure 11 is a plan and Figure 12 is a side sectional view on line 12, Figure 11, of vane carried wind guiding devices applicable to the mechanism of the foregoing figures; and Figure 13 is a reduced size end view of the mechanism of Figure 12.

The mechanism of this invention is preferably mounted above and concentrically with the vertical axis of a suitable house 10 having a roof 12 forming a room 14 within which the operator can work. Journaled in suitable bearings 16—18, carried by this house, is a vertical shaft 20—22 which is rotated by the windmill mechanism of this invention to deliver power to mechanism not shown located say below Figure 1. Rigidly supported upon the upper end portion 22 of this vertical shaft are two horizontal planes 24—26 of suitable construction, braced apart by suitable supports as 28 not entering into this invention and therefore not shown in detail. Surrounding the upper portion of the house mechanism 10 and suspended from the lower plane 24 is a cylindrical casing 30 of imperforate material from whose bottom ends is supported an annular horizontal plane 32 sustained by the walls of the casing 30 and the bracing mechanism 28, heretofore referred to.

Figure 4:
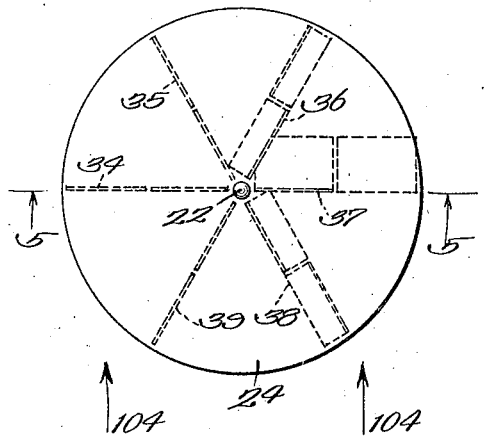
Figure 4 is a plan view showing the position of the different blades at a given moment of operation.

Radially mounted with reference to the shaft 22—20 and between the planes 24, 26, and 32 are a plurality of sets of wind blades or doors in the particular case illustrated in Figure 4, six sets, each set as a whole being designated in that figure as 34, 35, 36, 37, 38 and 39 respectively. Each set of blades comprises the equipment shown in Figure 3 and each two opposite sets comprise the equipment shown in Figure 1.

Each single set of blades or door equipments comprises three doors, 40, 42, and 44, arranged substantially as shown in the drawings.

One door 40 is suspended from plate 26 by hinges 48, and occupies the area enclosed by the planes 26 and 32, outside the cylindrical casing 30. Doors 42 and 44 occupy the area enclosed between the planes 24 and 26 outside the central shaft 22. In the particular case here illustrated, one door is suspended from plane 24 and the other is pivoted above plane 26, the selection in the particular case being the door 44 hinged at 50 from the upper plane while the door 42 is hinged at 52 from the lower plane. The doors described are prevented from swinging beyond a desired vertical plane by the angular stops 53 and 54 clearly shown in Figure 3. Each respective door carries a counterweight arm 56, 57 and 58 carrying at its outer end an adjustable counterweight 60. By moving the counterweights 60 in and out on the respective arms the respective doors may be so adjusted to handle any wind pressure which may be brought against them. Each door is also provided with one or more safety supplemental doors 62 hinged at 64 and adjustably held closed by a compression spring 66 on a rod 68. Each spring is selectively controlled by a nut 70 screw threaded on said rod. The respective springs 66 are so adjusted that when the pressure against the main door becomes too great the supplemental doors or slats 62 open and let part of the wind through, thus reducing the pressure on the main door or vane.

Each door 44 is provided with a latch 72 adapted to secure it up against the plane 24. Each door 42 is provided with a latch 74 adapted to secure it down against the plane 26, and each door 40 is provided with a latch 76 adapted to secure it up against the under side of plane 26. Each latch 72 is mounted on a shaft 78, carrying a dog 80 engageable by a reciprocable collar 82 driven by a rod 84 in case 22, said rod being manipulable by a handle 86 in the workman's room 14. In corresponding manner each latch 74 is moved by the dog 88 and driven by a reciprocable collar 90 carried on a swing 92 controlled by a handle 94. In a similar manner each latch 76 moves in unison with the dog 96 manipulated by a handle 98 through the agency of a sleeve 100. The workman can by properly manipulating these handles cause the respective latches to hold their adjacent doors in horizontal position in which position the wind has no effect upon the doors or upon the device, and conversely he can, by properly manipulating the handles, prevent the doors ever accidentally latching themselves in that position. It may be stated that the latches are moved in one direction by suitable springs 102. They normally stand ready to catch the doors. They are prevented from doing so by moving the hand levers.

Figure 5:
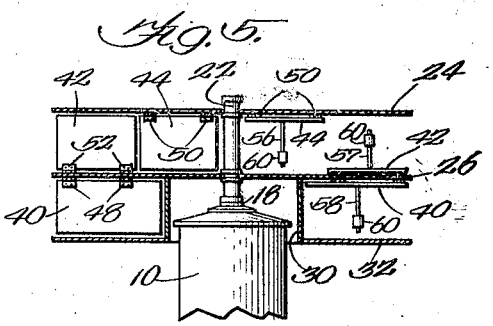
Figure 5 is a side view corresponding to Figure 1 taken on the line 5—5 of Figure 4, showing the positions of the immediately adjacent wind blades.

In the operation of the device, assume that the wind is blowing horizontally through the wheel mechanism in the direction of the arrows 104, Figure 4. The wind on the right hand half of the central shaft 22 swings the respective sets of doors 36, 37 and 38 to the positions indicated in Figures 4 and 5 wherein the wind passes freely through between the horizontal planes without substantial resistance to the rotation of the wheel. On the other hand the wind on the left hand half of the wheel strikes the different sets of doors more or less squarely and causes the wheel to rotate in a clockwise direction as viewed in Figure 4. As each set of doors approaches the position of 36 each door swings from vertical position to the position there shown; finally assumes the position shown in 37 and then returns through position 38 to the vertical position 39 wherein they are ready to do useful work in turning the wheel.

As has heretofore been indicated the supplemental doors 62 protect the device from damage if the wind becomes excessive and the proper adjustment of the counterweight 60 enables the doors to be adjusted to swing as desired on either the light or strong wind position. As the wheel is horizontal and the wind always blows in that direction, at least the device does away with all necessity for changes in the position of the wheel, such as required with vertical wind mills which must always automatically change themselves in position to suit the varying wind conditions. The device may be built very large in order to create great power in single unit.

In order to increase the efficiency of the mechanism shown in Figures 1 to 5 of the drawings, it has been found desirable to equip the doors 40—42—44 of that structure with wind retaining pockets so constructed that the wind on striking the doors is efficiently prevented from slipping off to one side of them, said pockets being however, equipped with supplemental doors which function in the same manner as supplemental doors 62. In applying this improved structure, doors 40—42—44 are replaced by door frames 110—112—114 pivoted as at 115 just as doors 40—44 are, and equipped with a lattice work or grid structure 116, clearly shown in face view in Figure 8, providing a plurality of rectangular walled passages 118 through the face of each door, through which in the absence of mechanism hereafter described, air engaging the face of the door passes. The surface 120 of the door on the side which the wind strikes, is preferably but not necessarily a plane surface while the opposite surface as 122 is convexly curved in a semi-circle as clearly shown in Figure 9. Each of these walled perforations 118 is closed, by one of a series of supplemental doors 124—126—128 or 130 which lie edge to edge on and in fact form the surface 122. Each of these supplemental doors is provided on one side with a proper hinge connection to the door proper and is adapted to be swung outward from its full line to the dotted line position of Figure 9 against the action of a suitable retractile spring 132 connected to the adjacent supplemental door and lying within the adjacent passage 118. These springs are at such a tension that under an ordinary wind pressure the wind striking the face 120 of each door enters the respective passages 118 of the door and pushes against the opposite small or supplemental door 124—130, as the case may be, to propel the windmill in the ordinary manner, as fully set forth heretofore, but when the wind pressure is too strong, the doors 124—130 partially or wholly open under such pressure and let the wind through, just as doors 162 open in the prior construction.

Means for adjusting tension of the springs 132 is readily providable by any suitable means, as for instance rods 134 and adjusting nuts 136, suitably to the springs in any manner obvious to any mechanic.

In other respects than the foregoing the structures of Figures 6 to 10 inclusive do not differ in any patentable sense from the door mechanism of Figures 1 to 5 inclusive.

In order to further increase the efficiency of the device by directing all of the wind toward the left hand side of the wheel and to exclude it from the right hand side thereof, when it is operating as shown and described in connection with Figure 4, and also as evenly as possible to distribute the wind which approaches said left hand side of the wheel between the various doors 40—42—44 which are engaged by the wind on said left hand side of the wheel, the mechanism of Figures 11, 12 and 13 is provided. This device consists of three bunched, tubular air passages 140, 142 and 144, grouped together as shown in Figure 13 and suspended on the framework 146 of a weathervanelike device 148 pivoted at 150 concentrically with the wind mill wheel 24—32 equipped at its opposite ends with wings or vanes 152 so constructed that the air will operate upon them as upon an ordinary weather vane to swing the mechanism here described so that its open end 154 always points towards the wind, whereby wind blowing into passage 142 will be directed exclusively to swinging door 42; wind blowing in passage 144 will be directed exclusively to swinging door 44 and wind blowing in passage 140 will be directed exclusively to door 40. The frame 146 is provided beyond the tubular parts described with a wheel enclosing flap 156 adapted to exclude wind from the wheel at that point, and it is provided at its front with a laterally extending curved wall 158 forming a part of passages 140 and 144, which tends to protect the right hand half of the main windmill wheel 24—32 from the wind blowing in the direction of arrows 104, Figure 4, when the wheel is operated as shown and described in connection with that figure. By the use of this device all of the wind blowing in the direction of said arrows 104 is directed to the left hand half of the wheel where it should go for efficient operation of the wind mill wheel 24—32 and it is further subdivided approximately equally between the doors 40, 42 and 44.

As the vane mechanism 152 always swings the entire device so that the open end 154 points directly to the wind, no matter what direction it may be blowing, practically perfect wind efficiency is obtained for the device.

Having thus fully described my invention, what I claim as new and desire to secure by Letters Patent, is:—

1. In mechanism of the class described, a rotatable vertical shaft, horizontal upper and lower planes fixed to the shaft, and a plurality of pairs of blades between the planes, the blades of each pair being respectively hinged to the planes with their hinge axes radial to the shaft.

2. In mechanism of the class described, a rotatable vertical shaft, horizontal upper and lower planes fixed to the shaft, and a plurality of pairs of blades between the planes, the blades of each pair being hinged respectively to the planes for movement in a plane parallel to the axis of said shaft.

3. In mechanism of the class described, a rotatable vertical shaft, horizontal upper and lower planes fixed to the shaft, and a plurality of pairs of blades between the planes, the blades of each pair being hinged respectively to the planes for movement in a plane parallel to the axis of said shaft and disposed when in active position in a common plane radial with respect to the shaft.

4. In mechanism of the class described, a pivoted horizontal wheel, wind engaging blades carried by said wheel pivoted to swing from a vertical position to a horizontal position, pivoted latches mounted on the wheel for engaging and holding said blades in a horizontal position, and manual means for selectively controlling said latches.

5. In mechanism of the class described, a pivoted horizontal wheel, wind engaging blades carried by said wheel pivoted to swing from a vertical to a horizontal position, pivoted latches mounted on the wheel for engaging and holding respective blades in a horizontal position, spring means constantly urging each latch to blade engaging position, and means for selectively moving said latches to blade releasing position.

6. In mechanism of the class described, a pivoted horizontal wheel, wind engaging blades carried by said wheel pivoted to swing from a vertical to a horizontal position, pivoted latches mounted on the wheel for engaging and holding respective blades in a horizontal position, spring means constantly urging each latch to blade engaging position, a plurality of elements movable axially of the wheel, means for selectively moving said elements, and connections between each element and predetermined latches whereby the movement of an element in a given direction will actuate the related latches to blade releasing positions.

7. In a mechanism of the class described, a rotatable horizontal wind wheel, a plurality of blades pivoted on the wheel for movement from horizontal to vertical position, a laterally directed arm secured to each blade, and a weight adjustable longitudinally of each arm to vary the resistance offered by the related blade against movement from horizontal to vertical position.

8. In mechanism of the class described, a horizontal wind wheel made up of two spaced apart horizontal planes carried by a vertical axis, a pair of wind doors or blades occupying the space between said planes at one side of said vertical axis, means hinging one door to the upper plane, means hinging the other door to the lower plane, and counterweight mechanisms for adjusting the wind pressure required to move each door.

9. In mechanism of the class described, a door having one wind engagable face and an opposite curved face made up of a plurality of supplemental doors, openable by excessive pressure of wind entering the door on the plane face, and means through the door forming a passage leading to each of the supplemental doors.

10. In mechanism of the class described, a door having one wind engagable face and an opposite curved face made up of a plurality of supplemental doors, spring controlled so that they may be opened by the pressure of wind entering the door on the plane face, and a grid work through the door forming a passage leading to each of the supplemental doors.

11. In mechanism of the class described, a rectangular door frame open at its central portion, said opening having across it a plurality of partitions forming an open grid work, the ends of the grid work on side of the door lying substantially in a plane surface coincident with the frame of the door, the ends of the grid work on the opposite side of the door lying on the arc of a circle curved toward said plane surface, and a supplemental door for each passage through the grid work lying on the curved side of the door and spring controlled to permit air passing through the grid work from the plane side of the door to open it.

12. In mechanism of the class described, a rectangular door frame open at its central portion, said opening having across it a plurality of partitions forming an open grid work, the ends of the grid work on side of the door lying substantially in a plane surface coincident with the frame of the door, the ends of the grid work on the opposite side of the door lying on the arc of a circle curved toward said plane surface, a supplemental door for each passage through the grid work lying on the curved side of the door and spring controlled to permit air passing through the grid work from the plane side of the door to open it, and means for adjusting the tension of each spring control mechanism.

13. In mechanism of the class described, in combination with a wind mill mechanism, a door adapted to be engaged by wind to propel that mechanism, perforated in the direction in which the wind strikes the door in the form of a plurality of parallel passages leading to supplemental doors at the backs of said passages, one for each such supplemental doors lying on the arc of a circle, and spring equipped to permit the wind to pass them when it exceeds a certain pressure, for the purposes set forth.

14. In mechanism of the class described, the combination with a wind wheel rotatable on a vertical axis and provided with a plurality of radially arranged doors which become effective for wheel rotating purposes only when moved to one side of the axis of rotation of the wheel, a wind directing tube carried by mechanism rotatable upon the same axis as the wind wheel pointed toward that half of the wheel which is effectively operating for rotation of the wind wheel and a vane mechanism engageable by the wind always turning said tube to face the wind and lead it to the proper side of said wind wheel.

15. In mechanism of the class described, the combination with a wind wheel rotatable on a vertical axis and provided with a plurality of radially arranged doors which become effective for wheel rotating purposes only when moved to one side of the axis of rotation of the wheel, a wind directing tube carried by mechanism rotatable upon the same axis as the wind wheel pointed toward that half of the wheel which is effectively operating for rotation of the wind wheel and a vane mechanism engageable by the wind always turning said tube to face the wind and lead it to the proper side of said wind wheel, and means carried with the tube excluding the wind from ready access to the other half of the wheel.

16. In mechanism of the class described, a horizontally disposed wind wheel provided on each of a plurality of radii with a plurality of vanes or doors which are only effective when on one side of the pivotal axis of the wheel to be there engaged by the wind which strikes the wheel and are inoperative when on the other side of the pivotal axis of the wheel, a plurality of wind directing tubes, one for each of said blades on a given radius of the wheel, a frame mounting for said tubes on the side of the wheel at which said blades become effective, and means automatically moving said bunch of tubes to always face the wind, for the purposes set forth.

17. In mechanism of the class described, a horizontally disposed wind wheel provided on each of a plurality of radii with a plurality of blades or doors which are only effective when on one side of the pivotal axis of the wheel to be there engaged by the wind which strikes the wheel and are inoperative when on the other side of the pivotal axis of the wheel, a plurality of wind directing tubes, one for each of said blades on a given radius of the wheel, a frame mounting for said tubes on the side of the wheel at which said blades become effective, means automatically moving said bunch of tubes to always face the wind, and means carried with the bunch of tubes excluding the wind from ready access to the other half of the wheel, for the purposes set forth.

18. In mechanism of the class described, in combination with a horizontally disposed rotatable wind wheel having wind engageable blades on a plurality of its radii, effective to rotate the wheel when on one side only of the wheel axis, a frame pivoted to rotate concentrically with said wheel, a weather vane on said frame adapted to automatically swing the main axis of the frame into the line of the wind, a plurality of tubes on the end of the frame which is opposite to the weather vane mechanism so arranged and shaped as to lead wind blowing along the axis of the frame to the effective vanes on said wheel and to exclude, in large measure, the wind from the other side of the wheel, for the purposes set forth.

In witness whereof, I have hereunto subscribed my name.

GOTTLIEB F. ZUCKER.